(12) United States Patent
Islam et al.

(10) Patent No.: US 8,806,117 B2
(45) Date of Patent: Aug. 12, 2014

(54) PREVENTION OF DATA LOSS DUE TO ADJACENT TRACK INTERFERENCE

(75) Inventors: Shah M. R. Islam, Tucson, AZ (US);
Sandeep R. Patil, Elmsford, NY (US);
Riyazahamad M. Shiraguppi, Maharashtra (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/352,131

(22) Filed: Jan. 17, 2012

(65) Prior Publication Data
US 2013/0185498 A1   Jul. 18, 2013

(51) Int. Cl.
*G06F 12/00* (2006.01)
(52) U.S. Cl.
USPC .......................................... 711/106; 365/222
(58) Field of Classification Search
None
See application file for complete search history.

(56) References Cited

U.S. PATENT DOCUMENTS

| | | | |
|---|---|---|---|
| 7,345,837 B1 * | 3/2008 | Schreck et al. | 360/31 |
| 7,477,465 B2 | 1/2009 | Yu | |
| 7,522,366 B2 | 4/2009 | Mettler et al. | |
| 7,864,476 B2 | 1/2011 | Ehrlich | |
| 7,974,029 B2 | 7/2011 | Tsai et al. | |
| 2005/0180267 A1 | 8/2005 | Jeong et al. | |
| 2005/0193250 A1 * | 9/2005 | Takeuchi et al. | 714/15 |
| 2006/0066971 A1 | 3/2006 | Alex et al. | |
| 2009/0135693 A1 | 5/2009 | Kim et al. | |
| 2009/0244775 A1 * | 10/2009 | Ehrlich | 360/135 |
| 2010/0014183 A1 * | 1/2010 | Aoki et al. | 360/71 |
| 2010/0268866 A1 * | 10/2010 | Colligan | 711/103 |
| 2011/0075290 A1 | 3/2011 | Hobbet | |

OTHER PUBLICATIONS

Guarisco and Li, "A Fast and Accurate Method for Measuring Adjacent-Track Erasure", IEEE Transactions on Magnetics, vol. 42, No. 12, Dec. 2006, pp. 3868-3873.
"Adaptively setting number of continuous writes before refreshing data based on track misregristration to reduce ATI and improve I/O performance in hard drive", ip.com PriorArtDatabase Technical Disclosure, IP.com No. IPCOMM000193624D, Mar. 5, 2010, pp. 1-4.
Li et al., "Adjacent Track Erasure Analysis and Modeling at High Track Density", IEEE Transactions on Magnetics, vol. 39, No. 5, Sep. 2003, pp. 2627-2629.
Tang et al., "Understanding Adjacent Track Erasure in Discrete Track Media", IEEE Transactions on Magnetics, vol. 44, No. 12, Dec. 2008, pp. 4780-4783.

* cited by examiner

*Primary Examiner* — Charles Rones
*Assistant Examiner* — Tian-Pong Chang
(74) *Attorney, Agent, or Firm* — Kunzler Law Group (57) ABSTRACT

For limiting data loss due to ATI or ATE, an apparatus may include a storage module, a tracking module, and a refresh module. The storage module is configured to store a risk value for a tracked storage division. The risk value indicates a risk level of data loss for the tracked storage division. The tracked storage division is one of a plurality of storage divisions of a data storage device. The tracking module is configured to update the risk value to indicate a higher risk level based on a write to a physically proximal storage division. The physically proximal storage division is within an interference range of the tracked storage division. The tracking module is configured to reset the risk value based on a write to the tracked storage division. The refresh module is configured to refresh the tracked storage division based on the risk value meeting a threshold value.

19 Claims, 6 Drawing Sheets

| ID | Risk |
|---|---|
| 0 | 1 |
| 1 | 0 |
| 2 | 12 |
| 3 | 6 |
| 4 | 30 |

| ID | Risk |
|---|---|
| 0 | 2 |
| 1 | 0 |
| 2 | 13 |
| 3 | 6 |
| 4 | 30 |

| ID | Risk |
|---|---|
| 0 | 2 |
| 1 | 0 |
| 2 | 14 |
| 3 | 0 |
| 4 | 31 |

| ID | Risk |
|---|---|
| 0 | 2 |
| 1 | 0 |
| 2 | 14 |
| 3 | 1 |
| 4 | 0 |

PREVENTION OF DATA LOSS DUE TO ADJACENT TRACK INTERFERENCE

FIELD

The subject matter disclosed herein relates to magnetic storage media and more particularly relates to prevention of data loss due to adjacent track interference.

BACKGROUND

Description of the Related Art

Magnetic storage media is commonly used for data storage in computing systems and devices. Magnetic storage devices generally store data by inducing a targeted magnetic field which causes a portion of a magnetic storage medium to align with the magnetic field. The aligned magnetic storage medium then retains this magnetic orientation even after the magnetic field is removed. Data can be read from medium by sensing or measuring the orientation of the magnetic field at certain portions of the medium.

However, during a write process the induced magnetic field may interfere with portions of the medium that are not meant to be written to. For example, adjacent or nearby tracks, sectors, clusters, or other storage divisions of a magnetic medium may be exposed to an induced magnetic field. Exposure to the induced magnetic field may actually cause one or more bits of data in an adjacent sector or storage division to degrade such that a magnetic orientation may be lost. Loss of magnetic orientation results in loss of data. The risk of data loss is increased for a portion of the magnetic storage medium each time a nearby storage division is written to. This risk of data loss is often referred to as adjacent track erasure (ATE) or adjacent track interference (ATI) although storage divisions of data smaller than tracks may be affected.

BRIEF SUMMARY

An apparatus for limiting data loss due to adjacent track interference is disclosed. The apparatus may include a storage module, a tracking module, and a refresh module. The storage module is configured to store a risk value for a tracked storage division. The risk value indicates a risk level of data loss for the tracked storage division. The tracked storage division is one of a plurality of storage divisions of a data storage device. The tracking module is configured to update the risk value to indicate a higher risk level based on a write to a physically proximal storage division. The physically proximal storage division is within an interference range of the tracked storage division. The tracking module is configured to update the risk value based on a write to the tracked storage division. The refresh module is configured to refresh the tracked storage division based on the risk value meeting a threshold value.

A method and system also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
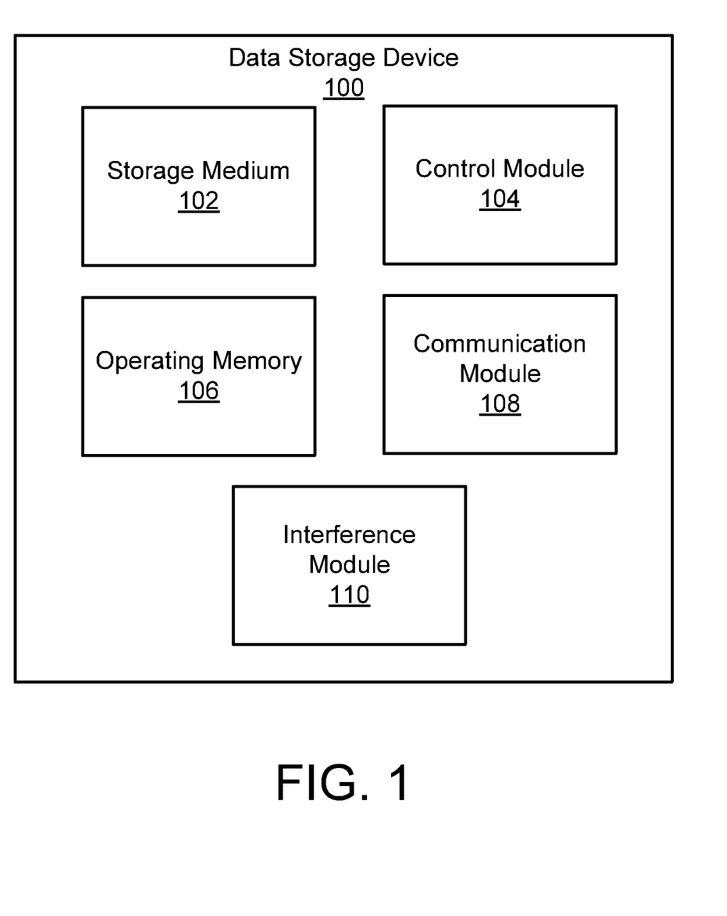
FIG. 1 is a schematic block diagram illustrating one embodiment of a data storage device in accordance with the present invention.

FIG. 1 is a schematic block diagram illustrating one embodiment of a data storage device 100. The data storage device 100 may be configured to store data for later recall. The data storage device 100 may store data magnetically or electronically. In the depicted embodiment, the data storage device 100 includes a storage medium 102, a control module 104, an operating memory 106, a communication module 108, and an interference module 110. The modules 102-110 are exemplary only and may not all be included in some embodiments.

The data storage device 100 may include a storage medium 102. The storage medium 102 may include any medium or mechanism for storing data known in the art. In one embodiment, the storage medium 102 may include a magnetic storage medium such as a hard disk in a magnetic hard disk drive. In one embodiment, the storage medium 102 may include one or more logic gates and/or capacitors for storing an electrical field such as flash memory.

The data storage device 100 may include a control module 104. In one embodiment, the control module 104 may control reading and/or writing processes and mechanisms. In one embodiment, the control module 104 may include control circuitry for accessing a location of a storage medium for reading and/or writing. In one embodiment, the control module 104 may control a location of a read/write head in a hard disk drive and/or an input signal into the read/write head for writing data.

The data storage device 100 may include operating memory 106. The operating memory 106 may include dynamic and/or static memory for operation of the storage device. For example, the operating memory 106 may operate in a manner similar to RAM on a computing device. Dynamic memory includes memory that requires very frequent refreshes of data and thus losses data when power is lost. Static memory includes memory that does not require frequent refreshes and may maintain data even after power is lost.

The data storage device 100 may include a communication module 108. The communication module 108 may be configured to communicate with other devices. In one embodiment, the communication module 108 may provide data read from the storage medium 102 to another device, such as a host computer. The communication module 108 may receive data and/or instructions from another device to write to the storage medium 102.

The data storage device 100 may include an interference module 110. The interference module 110 may track risk of data loss for one or more storage divisions of the storage medium 102. In one embodiment, the interference module 110 may store risk values for one or more tracked storage divisions. The interference module 110 may update the risk values based on writes to the tracked storage divisions and/or writes to storage divisions physically proximal to the tracked storage divisions. For example, the interference module 110 may increase the risk value for a specific storage division in response to writes of data to nearby storage divisions and may reset the risk value in response to data being written to the specific storage division. The interference module 110 may also refresh a tracked storage division when a corresponding risk value meets a threshold value.

Figure 2:
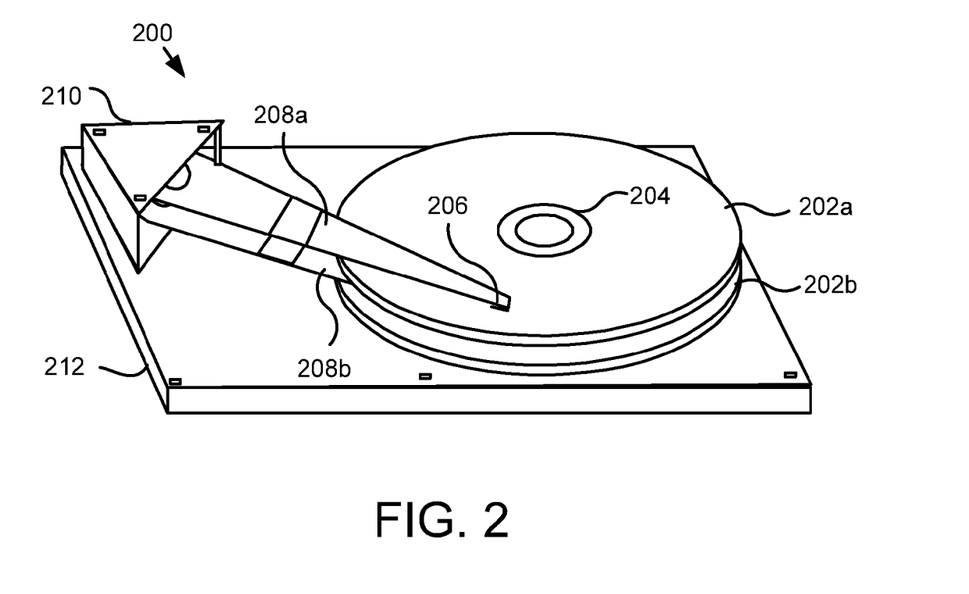
FIG. 2 is a perspective view illustrating components of one embodiment of a magnetic hard disk storage device in accordance with the present invention.

FIG. 2 is a perspective view illustrating components of one embodiment of a magnetic hard disk storage device 200. The magnetic hard disk storage device 200 is one exemplary embodiment of a data storage device 100. The magnetic had disk storage device 200 includes one or more storage disks 202a, 202b, a spindle 204, one or more read/write heads 206, suspension arms 208a, 208b, an arm actuator 210, and a support base 212.

The disks 202a, 202b may include magnetic storage media for magnetically storing information. For example, one or more surfaces of the disks 202a, 202b may include magnetic storage media. The spindle 204 allows the disks 202a, 202b to rotate about an axis defined by the spindle 204. The read/write head 206 is mounted on the suspension arm 208a, which is connected to the arm actuator 210. One or more additional read/write heads may be mounted on additional suspension arms such as suspension arm 208b. The arm actuator 210 actuates the position of the suspension arms 208a, 208b in conjunction with the rotation of the disks 202a, 202b about the spindle 204, and thereby physically actuates the location of the read/write head 206 and other read/write heads in relation to the surface of the disks 202a, 202b.

In a write mode, the read/write head 206 may be used to generate a magnetic field that changes the magnetic orientation of a portion of storage media of the disk 202a. In a read mode, the read/write head 206 reads information from the disk 202a by measuring or sensing an orientation of the magnetic fields of different portions of the storage media of the disk 202a. The support base 212 may include memory, modules, and/or circuitry for operation of the magnetic hard disk storage device 200. For example, the support base may include circuitry and/or memory making up a control module 104, operating memory 106, a communication module 108, and an interference module 110 as discussed in relation to FIG. 1.

Figure 3:
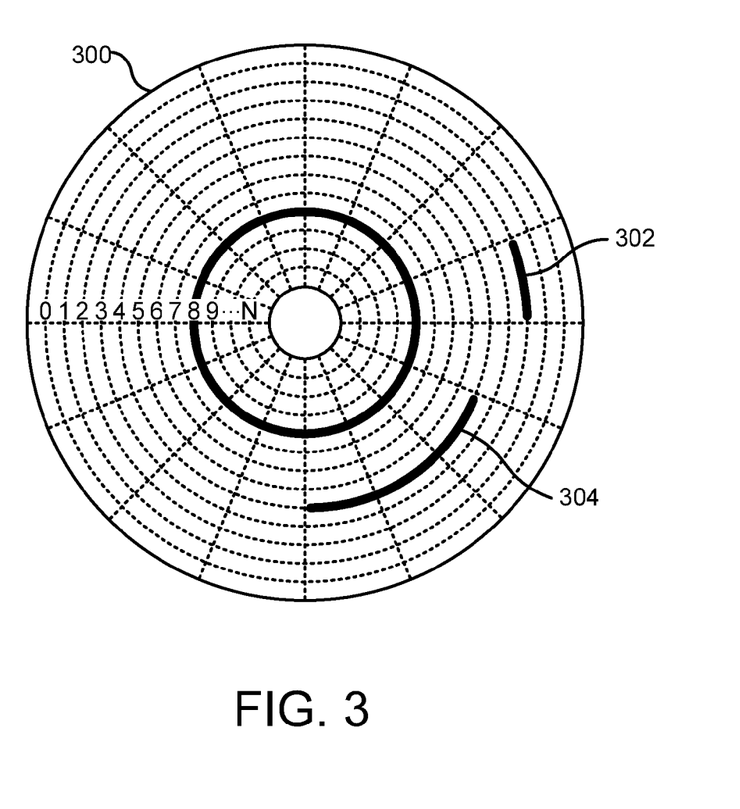
FIG. 3 is a schematic plan view diagram of magnetic storage disk divided into logical storage divisions in accordance with the present invention.

FIG. 3 is a schematic plan view of a magnetic storage disk 300 divided into logical storage divisions. The magnetic storage disk 300 is depicted having a plurality of tracks number 0-N. Each track may be a logical ring on the magnetic storage disk 300 where data may be magnetically stored. In one embodiment, the arm actuator 210 may actuate the arm 208a such that the read/write head 206 is situated over a desired track as the magnetic storage disk 300 is rotated. Exemplary track 8 is shown highlighted to illustrate an exemplary track.

Each track is divided into a plurality of sectors. Exemplary sector 302 is shown highlighted. Each sector may have a defined value memory size. For example, each sector may be capable of recording 512 bytes of information. Other sector sizes are possible and may be found in other embodiments. One or more sectors may be combined to form a cluster. An exemplary cluster 304 that includes three sectors is shown highlighted. Clusters of any other size are possible in other embodiments.

The tracks, sectors, and clusters as discussed above are exemplary storage divisions. As use herein the term storage division is given to broadly mean any logical division or memory block of a storage device. For example, the term storage division may be used herein as an abstracted term for any of a track, sector, cluster, or other physical or logical division of a storage medium. Although the storage divisions will be discussed primarily in relation to magnetic storage medium and more particularly in relation to magnetic storage disks, one of skill in the art will recognize that the scope of the present disclose extends to magnetic and/or electrical storage media of all types.

As discussed above, when a write is performed on a storage division a physically proximal storage divisions may be subject to interference. For example, magnetic fields generated to write data to a first storage division may interfere with storage divisions that are physically proximal to the first storage division and place them at risk for losing a stored magnetic orientation.

When writes are performed to tracks the interference of a magnetic field with a nearby track is often referred to as adjacent track interference (ATI). ATI leads to a risk of erasure of data on a nearby track and is often referred to as adjacent track erasure (ATE). As used herein the term adjacent track interference (ATI) is given to broadly mean any interference of a write field, whether electrical or magnetic, on a nearby storage division, whether a track, sector, cluster, or any other storage division of a magnetic or non-magnetic storage device. As used herein the term adjacent track erasure is given to broadly mean any risk of loss to a nearby storage division, whether a track, sector, cluster or any other storage division based on an electrical or magnetic field used during a write process.

One method of dealing with ATI and ATE may include tracking the number of writes to a specific track, sector, or other storage division. When the tracked storage division is written to a determined number of times the storage divisions near the tracked storage division may be refreshed by reading the data from the nearby storage divisions and rewriting that data to the respective storage division. One way of describing this method is that it tracks problem-causing tracks.

However by tracking problem causing tracks a number of inefficiencies result. For example, this method of tracking problem-causing tracks does not take writes to the nearby storage divisions into account. This can and often does result in the unnecessary refreshing of a track.

For example, tracks 1 and 2 (shown in FIG. 3) of the magnetic storage disk 300 may be high use tracks. This may mean that they are written to quite frequently. When a write is performed on track 1, ATI may result on tracks 0 and 2. When a write is performed on track 2, ATI may result on tracks 1 and 3. Using the method of tracking problem-causing tracks a refresh of tracks 0 and 2 may result based on the number of writes to track 1. In this case, the refresh of track 2 may be completely unnecessary since track 2 may have been recently refreshed based on writes to the track. Additionally a refresh of tracks 1 and 3 may result based on the number of writes to track 2. In this case, the refresh of track 1 may be unnecessary because track 1 may have been recently written to.

In the above example, twice as many refreshes than are necessary are performed. For example, refreshes of tracks 0 and 3 may have been needed but refreshes of tracks 1 and 2 were not. This is due to the recent writes to track 1 and 2 which operate to refresh the tracks and reduce the risk of data loss. In other words, even if track 2 has had many writes on it perhaps only a small number of the writes to track 2 were performed since a write to track 1 was last performed. Thus, track 1 may have been refreshed through the natural usage of the storage medium and no refresh may be needed. The unnecessary performance of refreshes, such as in the example described above, may cause a storage device to be unavailable for a greater period of time and/or use up more energy than necessary in the process. Unnecessary refreshes can lead to more frequent refreshes because each time a track is refreshed ATI may affect tracks near the refreshed tracks. Unnecessary and more frequent refreshes can lead to slower and less responsive storage systems that require higher energy usages. These have undesirable results of high energy consumption, increased cost of ownership, and reduced performance.

In one embodiment, the method and/or operations of the interference module 110 as described herein overcomes the problems and inefficiencies of the method of tracking problem-causing tracks. For example, the interference module 110 may limit unnecessary refreshes because risk values are reset each time a write is made to a specific track. Thus, in the case of tracks 1 and 2 being high use tracks, only tracks 0 and 3 may have been refreshed. Reducing the number of unnecessary refreshes may allow the storage device to be available for a higher percentage of time to perform data storage and/or data retrieval services for one or more devices or storage systems. This may increase overall performance of the data storage device.

Figure 4:
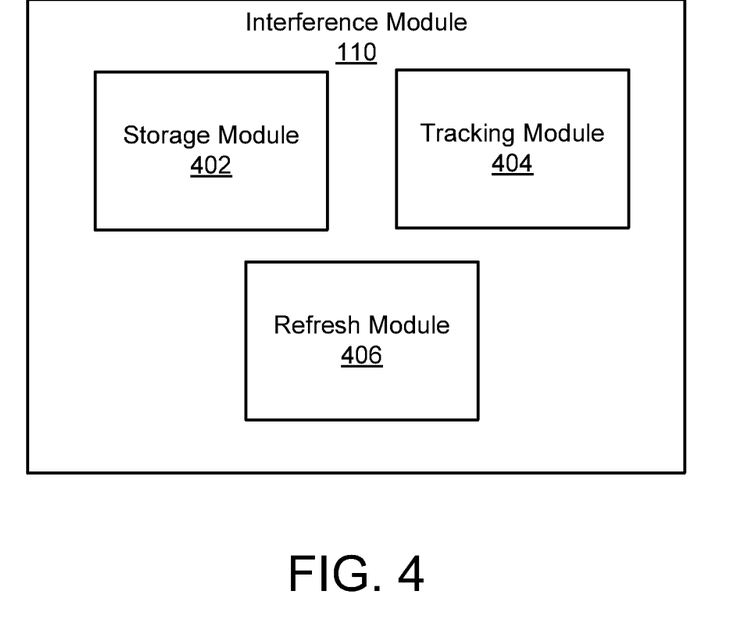
FIG. 4 is a schematic block diagram illustrating one embodiment of an interference module in accordance with the present invention.

FIG. 4 illustrates a schematic block diagram of one embodiment of an interference module 110. In one embodiment, the interference module 110 may protect from data loss due ATI and/or ATE. In the depicted embodiment, the interference module 110 includes a storage module 402, tracking module 404, and refresh module 406. In one embodiment, the interference module 110 may be embodied in circuitry, hardware, and/or software in a data storage device, such as the data storage device 100 of FIG. 1. In one embodiment, the interference module 110 may be embodied in circuitry, hardware, and/or software in a device or system that is in communication with a data storage device. For example, a host computing system or other computing device or system may run software that embodies the interference module 110.

In one embodiment, the storage module 402 stores risk values for one or more tracked storage divisions. A tracked storage division may include a storage division of a storage device where data is recorded. For example, a storage division may include a track, cluster, or sector of a magnetic storage disk. The storage division may include a storage division of an MRAM, tape drive, or any other type of magnetic storage device. In one embodiment, the storage division may include a storage division of flash storage or other non-magnetic storage device.

In one embodiment, the tracked storage divisions may include all storage divisions of a data storage device. In one embodiment, only a subset of storage divisions of in a data storage device may be tracked. In one embodiment, a tracked storage division may be a storage division that is likely to be at risk for data loss. For example, storage divisions near a high use storage division may be a greater risk for data loss and thus may be tracked. The storage module 402 may store risk values for these tracked storage divisions.

In one embodiment, all tracked storage divisions may be of the same size. For example, each tracked storage division may be a sector or a cluster of a specific size. In one embodiment, tracked storage divisions may be storage divisions of the same type. For example, the tracked storage divisions may include two or more tracks of different sizes. For example, tracks near a spindle of a magnetic storage disk may be smaller in memory size than tracks near an outer edge of a magnetic storage disk. In one embodiment, tracked storage divisions may have different memory sizes. In one embodiment, one tracked storage division may have a certain memory size while another tracked storage divisions may have a different memory size. For example, one tracked storage division may include a single sector, another tracked storage division may include a cluster of two or more sectors, and another tracked storage division may include a track.

In one embodiment, tracked storage division memory sizes may vary depending on a level of use of a region of storage media. For example, high use storage divisions may be storage divisions that are located near high use areas of a storage media and may have a smaller storage division memory size than storage divisions not in high use storage divisions. Low use storage divisions may be storage divisions that are located near low use areas of a storage media and may have larger storage divisions memory sizes than high use storage divisions. In one embodiment, additional variations in storage division memory size may be used for medium use or other regions of a disk.

For example, a region located near an outside edge of a magnetic storage disk may be written to and read from, more frequently than a region near a center of a magnetic storage disk. The term high use storage division does not necessarily mean that a storage division is often used but only that it is located near a region of a storage media that is highly used. In one embodiment, if a tracked storage division is near the outside edge it may be a high use storage division and have a smaller memory size than a storage division near a center of the magnetic storage disk. For example, a tracked storage division on the magnetic storage disk 300 of FIG. 3 may comprise a single sector 302 while a tracked storage division near a center of the magnetic storage disk 300 may include a full track. In one embodiment, a medium use storage division may include a cluster 304 of two or more sectors.

Different sizes for tracked storage divisions may allow for a manageable storage size for risk values stored by the storage module 402. For example, if a storage module 402 were required to store a risk value for each sector of a magnetic storage disk the operating memory of a data storage device may not be sufficient to hold all of the risk values. In some embodiments, risk values may be stored on storage medium of a memory device (such as on a magnetic storage disk) or in memory of a host computing system. Even if a storage module 402 stores only for storage divisions which may be at risk of data loss a very large amount of storage may still be used. Varying sizes for tracked storage divisions may allow for lower granularity for low risk storage areas while still allowing for high granularity for areas of a disk where data loss is most likely.

In one embodiment, smaller memory sized storage divisions in high use areas may reduce the amount of time required to refresh storage divisions. For example, if it is determined that a single sector is at risk of data loss it may be much quicker to refresh the single sector than refreshing a full track that includes that sector.

The risk values stored by the storage module 402 may include data, values, or any other information that indicates a risk level of data loss for a tracked storage division. A risk value may include a number, symbol, letter or word that indicates the level of risk of a for data loss. In one embodiment, a numerical value is used to indicate the level of risk. For example, a zero may indicate a lowest risk while increasing number values may indicate higher and higher risk.

The storage module 402 may store risk values in any manner known in the art. For example, the risk values may be stored in a table, database, matrix, or any other data structure known in the art. In one embodiment, a table may include a plurality of columns and a plurality of rows. In one embodiment, each row may correspond to a different tracked storage division. In one embodiment, each column may include information corresponding to the storage divisions of each row. Exemplary columns may include a storage division ID column and a risk value column.

In one embodiment risk values may be stored in dynamic memory. In one embodiment, the dynamic memory may include operating memory of a data storage device. In one embodiment, the dynamic memory may include memory on a computing system that is in communication with the data storage device. For example RAM on a data storage device and/or a computing system may be used to store the risk values. In one embodiment, storage of risk values in dynamic storage may allow the risk values to be lost if power is lost to the dynamic memory.

In one embodiment, risk values may be stored in static memory. In one embodiment, a primary storage media of a data storage device may be used to store the risk values. In one embodiment, the primary storage media may include a magnetic or electrical storage media such as a magnetic storage disk, MRAM, flash memory, or other storage media. In one embodiment, storage of risk values on a static storage media may allow the risk values to be maintained even after power is removed from a data storage device.

In one embodiment, risk values may be stored in dynamic memory and periodically saved or backed up to static memory. In one embodiment, this may allow dynamic memory, which is often faster than static memory, to be used for updating risk values but also have backup version of the table in the case of loss of power or the powering down of a data storage device. Upon a power up after a power loss or reboot the risk values in static memory may then be copied to dynamic memory to continue tracking of risk values.

The tracking module 404 may update the risk values for tracked storage division based on writes to storage divisions of a data storage device. In one embodiment, the tracking module 404 updates a risk value to reflect a higher risk in response to a write being performed to a physically proximal storage division. For example, a risk value may be adjusted upwards to indicate that a tracked storage division has a greater risk. In one embodiment, physically proximal storage divisions may include an immediately adjacent storage division. For example, a neighboring track, sector, or cluster in any direction may be a physically proximal storage division. In one embodiment, a physically proximal storage division may include a storage division which is overlapped by an interference field of a magnetic or electrical write field. For example an interference field may include an area surrounding storage division that may be affected by a magnetic or electrical write field.

In one embodiment, the tracking module 404 updates a risk value to reflect a reduced or maintained level of risk in response to a write being performed to a tracked storage division. For example, a risk value may be reset to reflect a minimal level of risk of data loss. In one embodiment, if the risk value is already a minimal level the risk value may not be updated but may remain at the same value.

In one embodiment, the tracking module 404 may only reduce or reset a risk level only if the whole of a storage division has been written to. For example, if only one sector of a track has been written to, the tracking module 404 may not reduce the risk level because there may be unwritten portions of the track that may still be at risk for data loss.

In one embodiment the tracking module 404 updates risk values for tracked storage divisions in real time. For example, the risk values may be updated each time a write to a physically nearby storage division is performed. For example, the risk values may be updated during normal usage of the disk and/or during a refresh cycle or process. In one embodiment, the risk values may be updated periodically. For example, risk values may be updated to reflect writes to physically proximal storage divisions that occurred during a time period since a last update.

In one embodiment, the refresh module 406 may refresh a storage division in response to a corresponding risk value meeting a threshold value. In one embodiment, refreshing a storage division may include writing data to the storage division. For example, refreshing the storage division may include reading data from the storage division and rewriting that data to the storage division. In one embodiment, the tracking module 404 may adjust a risk value for a storage division that is physically proximal to the storage division to indicate an increased level of risk to the physically proximal storage division.

A threshold value may include a value that indicates a risk level where a refresh of a storage division is desirable. In one embodiment, the threshold value may be a static value that remains the same throughout the life of a storage device. For example, a manufacturer may set a threshold value that can be used during the life of a data storage device and may be configured to limit the chances of data loss throughout the life of the device. In one embodiment, the threshold value may be a variable value. For example, the data storage device, a computing system in communication with the data storage device, and/or a user may be able to adjust the threshold value.

In one embodiment, the threshold value may vary with one or more metrics of a data storage device. In some embodiments, risk of data loss due to ATI and/or ATE may be at least partially dependent on a temperature of a medium or an age of a device. Exemplary metrics may include age of the device, temperature of the device, workload, or any other metrics. For example, a data storage device may adjust the threshold value based on a temperature of a storage medium and/or an operating environment.

In one embodiment, refreshing a storage division may include rewriting data in the storage division. For example, refreshing a storage division may include reading data from the storage division and rewriting that data back to the storage division. In one embodiment, the tracking module 404 may then update a risk value for the storage division. For example, the risk value may be updated to a zero value to indicate a minimal level of risk.

In one embodiment, the refresh module 406 may initiate a refresh cycle. In one embodiment, the refresh cycle may include determining whether one or more stored risk values exceed a threshold value. In response to determining that a risk value meets a threshold value a corresponding storage division may then be refreshed. In one embodiment, the refresh module 406 may periodically initiate a refresh cycle to determine if any storage divisions need refreshing. For example, the refresh module 406 may initiate a refresh cycle every few minutes, hours, or any other time period. In one embodiment, the refresh module 406 may initiate a refresh cycle based on the amount of data written to a data storage device. For example, a refresh cycle may be initiated after 500 MB have been written to the data storage device. In one embodiment, the refresh module 406 may initiate a refresh cycle during a break in usage of a data storage device. For example, the refresh module 406 may wait until a write process, read process, or other process is finished before initiating a refresh cycle.

In one embodiment, the refresh module 406 may determine a likelihood of writing to the storage division in the near future. In one embodiment, the refresh module 406 may look at a current location of a read write head and determine that the storage division will be written to soon. For example, if a storage device is scheduled to write to a storage division that is near or logically preceding the storage division it may be determined that it is likely that the storage divisions will be written to soon. In one embodiment, a refresh module 406 may look to a queue of data to be written to a storage medium and determine if the storage division is listed in the queue.

In one embodiment, if the refresh module 406 determines that a storage division is to be written to in the near future the refresh module 406 may forgo refreshing the storage division. This may be the case even if the storage division has a corresponding risk value that exceeds the threshold value.

Turning now to FIGS. 5A-5D exemplary updating of stored risk values will be illustrated. FIGS. 5A-5D illustrate one embodiment of an interference table 500 with exemplary risk values. In one embodiment, FIGS. 5A-5D illustrate with exemplary risk values of the interference table 500 between writes to the magnetic storage disk 600.

The interference table 500 includes an ID column and a risk column. In one embodiment, the ID column includes an identifier value that corresponds to a storage division of a data storage device. In the depicted embodiment, the ID column includes exemplary identifier values that correspond to the tracks 0-4 on the magnetic storage disk 600 of FIG. 6. Other embodiments may include identifier values that correspond to storage divisions of any other memory size including, but not limited to, sectors, clusters and/or any other storage division.

The interference table 500 includes a plurality of rows. In one embodiment, each row corresponds to one of the tracks of the tracks 1-5. For example, in FIG. 5A the first row includes an identifier value of '0' and a risk value of '1'. This may indicate that track 0 has a corresponding risk value of '1'. Additionally, the other rows include identifier values of '1', '2', '3', and '4' with corresponding risk values of '0', '12', '6', and '30', respectively.

Figure 5A:
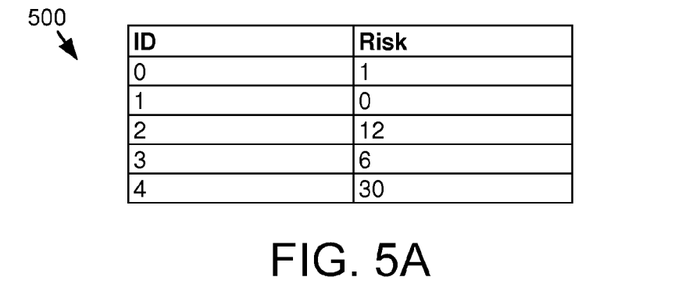
FIGS. 5A-5D illustrate an interference table with exemplary risk values between writes to a magnetic storage disk in accordance with the present invention.
Figure 5B:
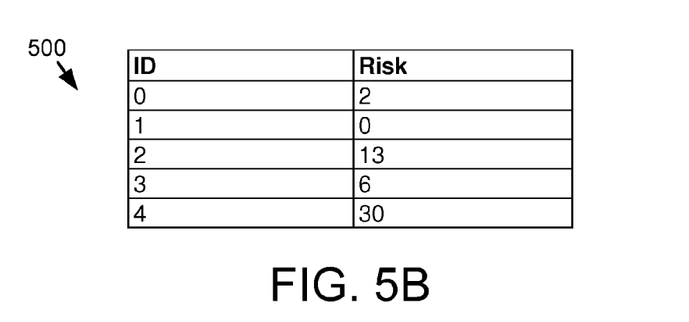
Figure 6:
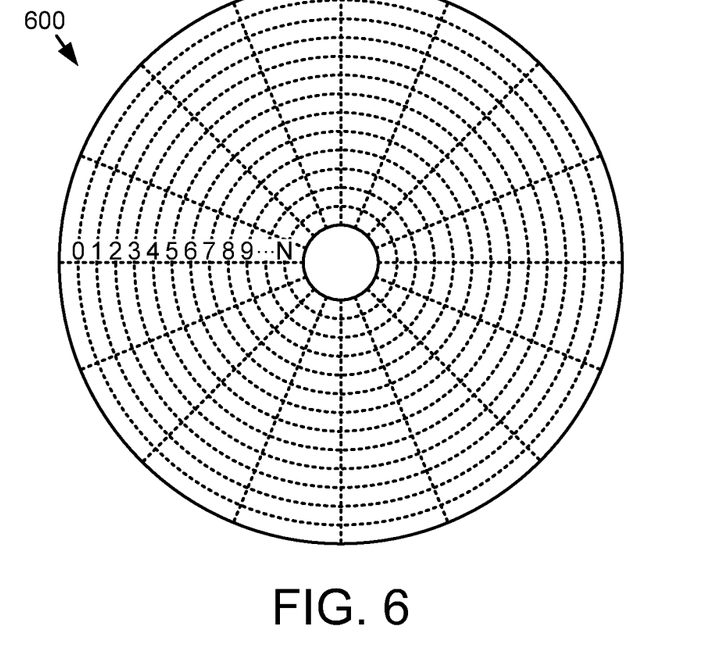
FIG. 6 is a schematic plan view diagram of a magnetic storage disk in accordance with the present invention.

FIG. 5A illustrates the interference table 500 at a first time period and includes risk values of '1', '0', '12', '6', and '30' for the respective tracks 0-4. FIG. 5B illustrates the interference table 500 at a second time period after a write to track 1 of the magnetic storage disk 600 has been performed. FIG. 6 illustrates that tracks 0 and 2 neighbor track 1. The interference table 500 includes risk values of '2', '0', '13', '6', and '30'. These values when compared with those of FIG. 5A reflect that track 0 has an increased risk due to neighboring track 1 being written to. The risk value has been incremented from '1' to '2' to reflect this increased risk. Track 1 (identifier value of '1') still has a risk value of '0' because no neighboring tracks have been written to and it was currently rewritten. Track 2 (identifier value of '2') has a risk value that has increased from '12' to '13' to reflect the write to track 1. Tracks 3 and 4 have unchanged risk values.

Figure 5C:
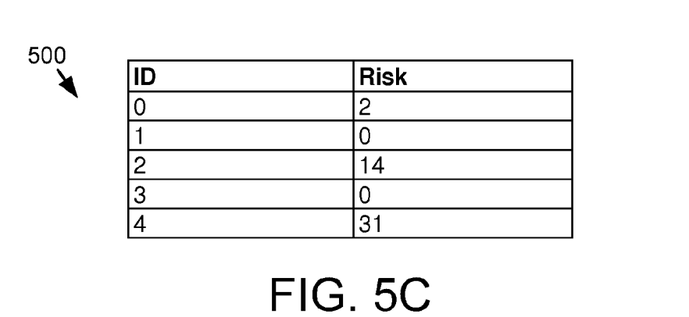

FIG. 5C illustrates the interference table 500 at a third time period after a write to track 3 (identifier value of '3'). Track 2 (identifier value of '2') includes a risk value that has increased from '13' to '14' to reflect the write to the neighboring track 3. Track 3 (identifier value of '3') includes a risk value that has been reset from '6' to '0' to reflect that it has been written to. Track 4 (identifier value of '4') includes a risk value that has increased from '30' to '31' to reflect the write to the neighboring track 3.

Figure 5D:
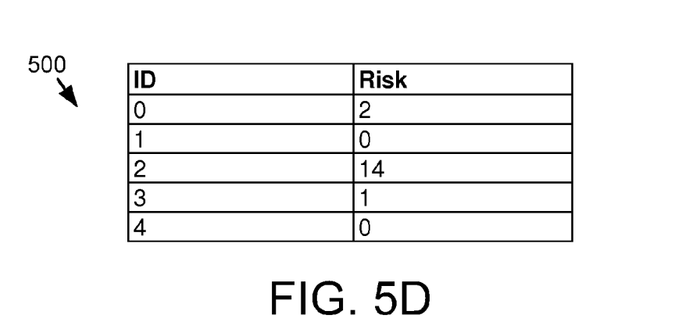

FIG. 5D illustrates the interference table 500 at a fourth time period after a refresh cycle. According to one embodiment, the refresh cycle included comparing the risk values to a threshold value of '30' and refreshed if they exceeded that value. As a result of the refresh cycle only Track 4 (identifier value of '4') has been refreshed. In one embodiment, the data of FIG. 4 was read and rewritten. The risk value of track 4 has been reset to '0' and the neighboring track 3 (identifier value of '3') has been incremented to '1' to reflect the write to track 4 that took place during the refresh cycle.

One of skill will understand that the exemplary interference table 500 and states of FIGS. 5A-5D are exemplary and provided for illustration purposes only. For example, the size of the interference table 500, ID values, and risk values are exemplary only. In one embodiment, the interference table 500 is only a portion of an interference table for the magnetic storage disk 600 of FIG. 6. In one embodiment, an interference table 500 may include a very large number of rows and/or columns. In one embodiment, an interference table may include a row for each storage division of a magnetic storage disk 600. In one embodiment, only a sub-portion of storage divisions may be included in the rows of an interference table.

Additionally, the updating of the risk values based on writes to storage divisions was exemplary only. Increasing risk values by one based on a write to a neighboring track and resetting to zero is only one embodiment of how the risk values may be updated. In other embodiments, the risk values may be updated or reset based on any other risk value system. For example, higher risk values may correspond to lower risk levels, etc. In one embodiment, risk values may be based on letters, symbols or words, rather than numbers. One of skill in the art will recognize considerable variation within the scope of the present disclosure.

Figure 7:
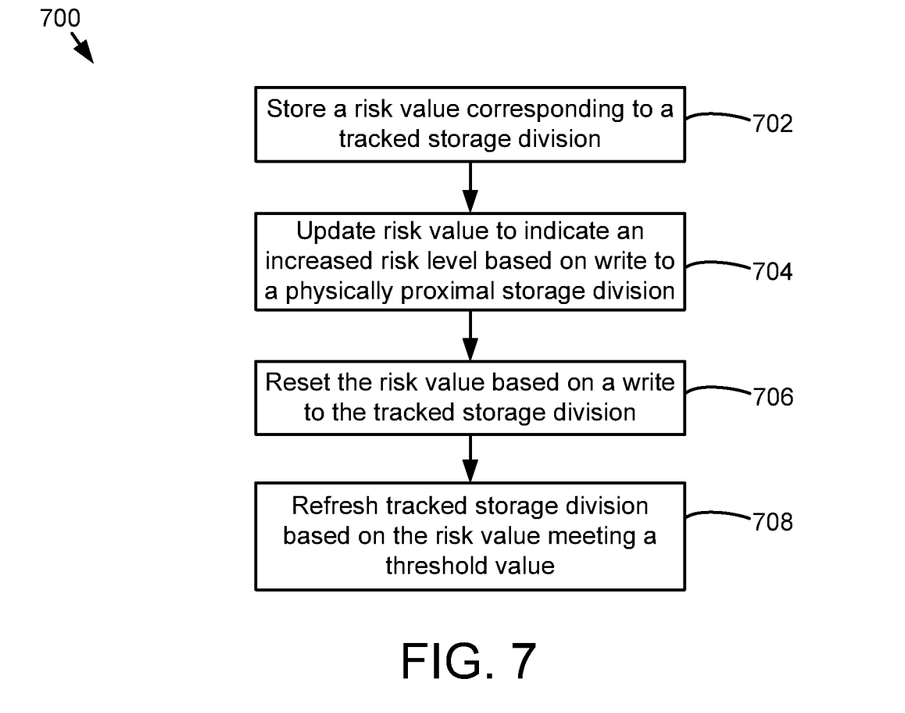
FIG. 7 is a schematic flow chart diagram illustrating one embodiment of a method for managing data loss due to adjacent track interference in accordance with the present invention.

Turning to FIG. 7 a schematic flow chart diagram illustrates one method 700 for managing data loss due to ATI and/or ATE. In one embodiment, the method 700 may be performed by the interference module 110 of FIG. 4. In one embodiment, the method 700 may be used to reduce data loss on a data storage device.

The method 700 includes storing 702 a risk value correspond to a tracked storage division. The risk value may be stored 702 by a storage module 402. In one embodiment, the tracked storage division is one of a plurality of storage divisions of a data storage device. In one embodiment, the risk value indicates a risk level for data loss on the tracked storage device due to ATI. In one embodiment, the risk values are stored 702 in a table or other data structure.

The method 700 includes updating 704 the risk value to indicate an increased risk level based on one or more writes to a storage division that is physically proximal to the tracked storage division. In one embodiment, the risk value may be updated 704 by a tracking module 404. The risk value may be updated 704 to indicate an increased risk level in response to a write to a storage division that is physically proximal to the tracked storage division. In one embodiment, the risk value may be a numerical risk value where a larger number indicates a higher level of risk than a lower number. For example, a risk value of '0' may indicate a lowest level of risk. In one embodiment, the risk value may be updated '0' to increase by one for every write to a physically proximal storage division.

The method 700 includes resetting 706 the risk value to indicate a reduced or maintained level of risk based on a write to the tracked storage division. In one embodiment, resetting 704 the risk value may include setting the risk value to '0'. For example, a risk value of '0' may indicate a minimum level of risk.

The method 700 includes refreshing 708 the tracked storage division based on the risk value meeting a threshold value. In one embodiment, the tracked storage division may be refreshed 708 by a refresh module 406. In one embodiment, refreshing 708 the tracked storage division may include reading data from the tracked storage division and rewriting the data to the tracked storage division. An update of the risk value that corresponds to the tracked storage division and/or a risk value of a physically proximal storage division may also be performed. For example, the risk value may be reset 706 based on the refresh 708 performed by a refresh module 406. In one embodiment, a risk value of a storage division that is physically proximal to the tracked storage division may be updated 704 to reflect an increased level of risk based on the refresh 708 of the tracked storage division.

In one embodiment, refreshing 708 the tracked storage division may include initiating a refresh cycle. For example, refreshing 708 may include initiating the refresh cycle method 800 of FIG. 8.

Figure 8:
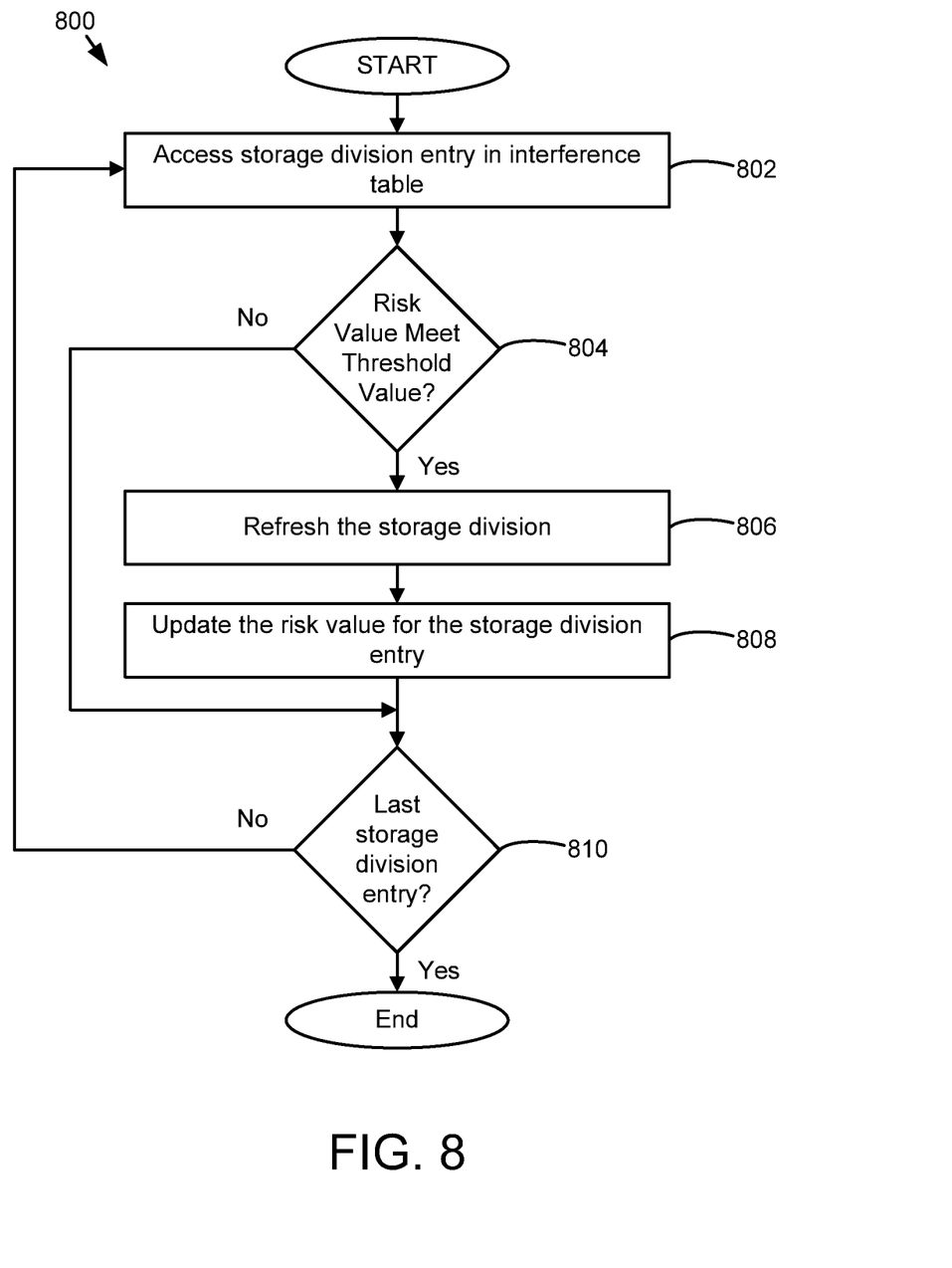
FIG. 8 is a schematic flow chart diagram illustrating one embodiment of a refresh cycle method in accordance with the present invention.

Turning to FIG. 8 a schematic flow chart diagram illustrates one embodiment of a refresh cycle method 800. In one embodiment, the method 800 may be initiated by the interference module 110 of FIG. 4. In one embodiment, the method 800 may be initiated by a refresh module 406.

The method 800 includes accessing 802 a storage division entry in an interference table. The interference table may include a plurality of storage division entries. In one embodiment, the interference table includes a storage division ID and a corresponding risk value. In one embodiment, accessing 802 the storage division entry may include accessing the risk value that corresponds to a tracked storage division.

The method 800 includes determining 804 if a risk value meets a threshold value. Determining 804 whether the risk value meets the threshold value may include comparing the risk value to the threshold value. In one embodiment, if the risk value indicates a risk level higher equal to or higher than the threshold value it may be determined 804 that the risk value does meet the threshold value. In one embodiment, if the risk value indicates a risk level higher equal to or lower than the threshold value it may be determined 804 that the risk value does not meet the threshold value ("No" branch on step 804).

In response to determining 804 that the risk value meets the threshold value ("Yes" branch on step 804) the method 800 includes refreshing 806 the storage division. The storage division may be refreshed 806 by a refresh module 406. In one embodiment, refreshing 806 the storage division may include reading data from the tracked storage division and rewriting the data to the tracked storage division.

The method 800 includes updating 808 the risk value for the storage division entry. In one embodiment, the risk value is updated 808 in response to refreshing 806 the storage division. In one embodiment, the risk value is updated 808 in the manner discussed in relation to step 704 of the method 700 of FIG. 7. For example, the risk value for the storage division entry may be reset to a '0' value or other value indicating a minimum level of risk. In one embodiment, the method 800 may also include updating a storage division that is physically proximal to the storage division that corresponds to the storage division entry to indicate an increased level of risk.

In response to determining 804 that the risk value does not meet the threshold value ("No" branch on step 804) the method may skip refreshing 806 the storage division and/or updating 808 the risk value.

The method 800 includes determining 810 if the accessed storage division entry is the last storage division entry in the interference table. In response to determining 810 that the storage division entry is the last storage division entry in the interference table ("Yes" branch of step 810), the method 800 may end. In response to determining 810 that the storage division entry is not the last storage division entry in the interference table ("No" branch of step 810) the method 800 may repeat with a next storage division entry. In one embodiment, the method may include returning to step 802 and accessing 802 a storage division entry in the interference table.

In one embodiment, the steps and decisions 802-810 may be repeated until each storage division entry has been reviewed to see if a corresponding storage division needs to be refreshed.

In one embodiment, the method 800 may include one or more additional steps. In one embodiment, for example, the method 800 may include determining a likelihood of writing to the storage division in the near future. In one embodiment, the refresh module 406 may look at a current location of a read write head and determine that the storage division will be written to soon. For example, if a storage device is scheduled to write to a storage division that is near or logically preceding the storage division it may be determined that it is likely that the storage divisions will be written to soon. In one embodiment, a refresh module 406 may look to a queue of data to be written to a storage medium and determine if the storage division is listed in the queue.

In one embodiment, if the refresh module 406 determines that a storage division is to be written to in the near future the refresh module 406 may forgo refreshing the storage division. This may be the case even if the storage division has a corresponding risk value that exceeds the threshold value. This may allow the future write to perform the refresh of the storage division and limit the amount of time taken to perform a refresh of tracked storage divisions.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a storage module configured to store a risk value for a tracked storage division, the risk value indicating a risk level of data loss for the tracked storage division, the tracked storage division comprised in a plurality of storage divisions of a data storage device, the storage module further configured to periodically save the risk value to static memory;
   a tracking module configured to update the risk value to indicate a higher risk level based on a write to a physically proximal storage division, the physically proximal storage division within an interference range of the tracked storage division, the tracking module further configured to reset the risk value based on a write to the tracked storage division; and
   a refresh module configured to refresh the tracked storage division based on the risk value meeting a threshold value, the refresh module further configured to forgo refreshing the tracked storage division based on one of a current location of a read write head of the data storage device, the storage device writing to a division that logically precedes the tracked storage division, and the tracked storage division being listed in a write queue.

2. The apparatus of claim 1, wherein resetting the risk value comprises updating the risk value to indicate a minimum level of risk.

3. The apparatus of claim 1, wherein the write to the tracked storage division comprises writing data to the whole of the tracked storage division.

4. The apparatus of claim 1, wherein the risk value comprises a first risk value, wherein the storage module stores a plurality of risk values, the plurality of risk values comprising at least the first risk value and one or more additional risk values, wherein each of the plurality of risk values corresponds to a storage division of the plurality of storage divisions of the storage device.

5. The apparatus of claim 4, wherein the plurality of storage divisions are substantially equal in memory size.

6. The method of claim 4, wherein the plurality of storage divisions are different in memory size.

7. The apparatus of claim 6, wherein the plurality of storage divisions comprise one or more high use storage divisions and one or more low use storage divisions and wherein the high use storage divisions comprise a smaller memory size than the low use storage divisions.

8. The apparatus of claim 4, wherein the storage device comprises a magnetic storage device.

9. The apparatus of claim 1, wherein updating the risk value is performed in real time.

10. The apparatus of claim 1, wherein the risk value is stored in dynamic memory.

11. The apparatus of claim 1, wherein the threshold value comprises a variable value.

12. The apparatus of claim 1, wherein refresh module is configured to initiate a refresh cycle, the refresh cycle comprising comparing the risk value to the threshold value.

13. The apparatus of claim 12, wherein the refresh cycle comprises determining a likelihood of writing to the tracked storage division in the near future and delay refreshing the tracked storage division if the likelihood is sufficiently high.

14. The apparatus of claim 1, wherein the tracking module updates the physically proximal storage division in response to the refresh module refreshing the tracked storage division.

15. A method comprising:
storing a risk value for a tracked storage division, the risk value indicating a risk level of data loss for the tracked storage division, the tracked storage division comprised in a plurality of storage divisions of a data storage device;
updating the risk value to indicate a higher risk level based on a write to a physically proximal storage division, the physically proximal storage division within an interference range of the tracked storage division, and updating the risk value based on a write to the tracked storage division;
saving the risk value to static memory; and
refreshing the tracked storage division based on the risk value meeting a threshold value, and forgoing refreshing based on one of a current location of a read write head of the data storage device, the storage device writing to a division that logically precedes the tracked storage division, and the tracked storage division being listed in a write queue.

16. The method of claim 15, wherein updating the risk based on a write to the tracked storage division comprises resetting the risk value.

17. The method of claim 15, wherein the write to the tracked storage division comprises writing data to the whole of the tracked storage division.

18. The method of claim 15, wherein the risk value comprises a first risk value, wherein the storage module stores a plurality of risk values, the plurality of risk values comprising at least the first risk value and the physically proximal storage division, wherein each of the plurality of risk values corresponds to a storage division of the plurality of storage divisions of the storage device.

19. A system comprising:
a storage medium, the storage medium comprising a plurality of storage divisions, the plurality of storage divisions comprising a tracked storage division and a physically proximal storage division;
a storage module configured to store a risk value for the tracked storage division, the risk value indicating a risk level of data loss for the tracked storage division, the storage module periodically saving the risk value to static memory;
a tracking module configured to update the risk value to indicate a higher risk level based on a write to the physically proximal storage division, the physically proximal storage division within an interference range of the tracked storage division, the tracking module further configured to update the risk value based on a write to the tracked storage division; and
a refresh module configured to refresh the tracked storage division based on the risk value meeting a threshold value, the refresh module further configured to forgo refreshing the tracked storage division based on one of a current location of a read write head of the data storage device, the storage device writing to a division that logically precedes the tracked storage division, and the tracked storage division being listed in a write queue.

* * * * *